Nov. 30, 1965    G. CARAMANNA    3,220,189
DUAL MASTER CYLINDER PUSH ROD EQUALIZING SYSTEM
Filed April 13, 1964    2 Sheets-Sheet 1

INVENTOR.
George Caramanna
BY  O.D. McGraw
His Attorney

Nov. 30, 1965 G. CARAMANNA 3,220,189
DUAL MASTER CYLINDER PUSH ROD EQUALIZING SYSTEM
Filed April 13, 1964 2 Sheets-Sheet 2

INVENTOR.
George Caramanna
BY
O.D. McGraw
His Attorney

United States Patent Office 3,220,189
Patented Nov. 30, 1965

3,220,189
**DUAL MASTER CYLINDER PUSH ROD
EQUALIZING SYSTEM**
George Caramanna, Detroit, Mich., assignor to General
Motors Corporation, Detroit, Mich., a corporation of
Delaware
Filed Apr. 13, 1964, Ser. No. 359,261
4 Claims. (Cl. 60—54.6)

This invention relates to force equalizing systems and more specifically to an equalizer bar that is used to equalize pressure exerted on two master cylinders by a single pedal.

In the design of automobile braking systems, it has become desirable to have a separate braking system for the rear and front wheel brakes of a vehicle. Typically, both of these braking systems are operated by a single brake pedal. Therefore, a need develops for a linkage that will allow even distribution of force from a single pedal to a pair of hydraulic master cylinders. Additionally, a need arises to direct all the force of the brake pedal movement to one of the operating master cylinders in the event that there is a power loss in either of the systems.

Therefore, it is an object of the present invention to provide an improved force equalizing bar that will act as a link between a single brake pedal and a plurality of master cylinders.

It is another object of the present invention to provide an improved force equalizing bar linking a single brake pedal with two master cylinders which will be operative whether the brake pedal is suspended pivotally in its mounting or is pivoted upwardly from a base.

It is still another object of the present invention to provide an improved force equalizer bar for use as a link between a brake pedal and a plurality of hydraulic master cylinders which will provide a direct force transmitting means to the operative one of the two master cylinders when one fails.

It is a further object of the present invention to provide a force equalizing linkage between a single brake pedal and a plurality of master cylinders which will automatically compensate for a varying angular relationship between a pivoted brake pedal and parallelly disposed push rods to master cylinders.

It is yet a further object of the present invention to provide an improved equalizing bar for use as a link between a single brake pedal and dual master cylinders which is inexpensive and simple to manufacture.

Further objects and advantages of the present invention will be apparent from the following description, reference being had to the accompanying drawings wherein a preferred embodiment of the present invention is clearly shown.

Figure 1:
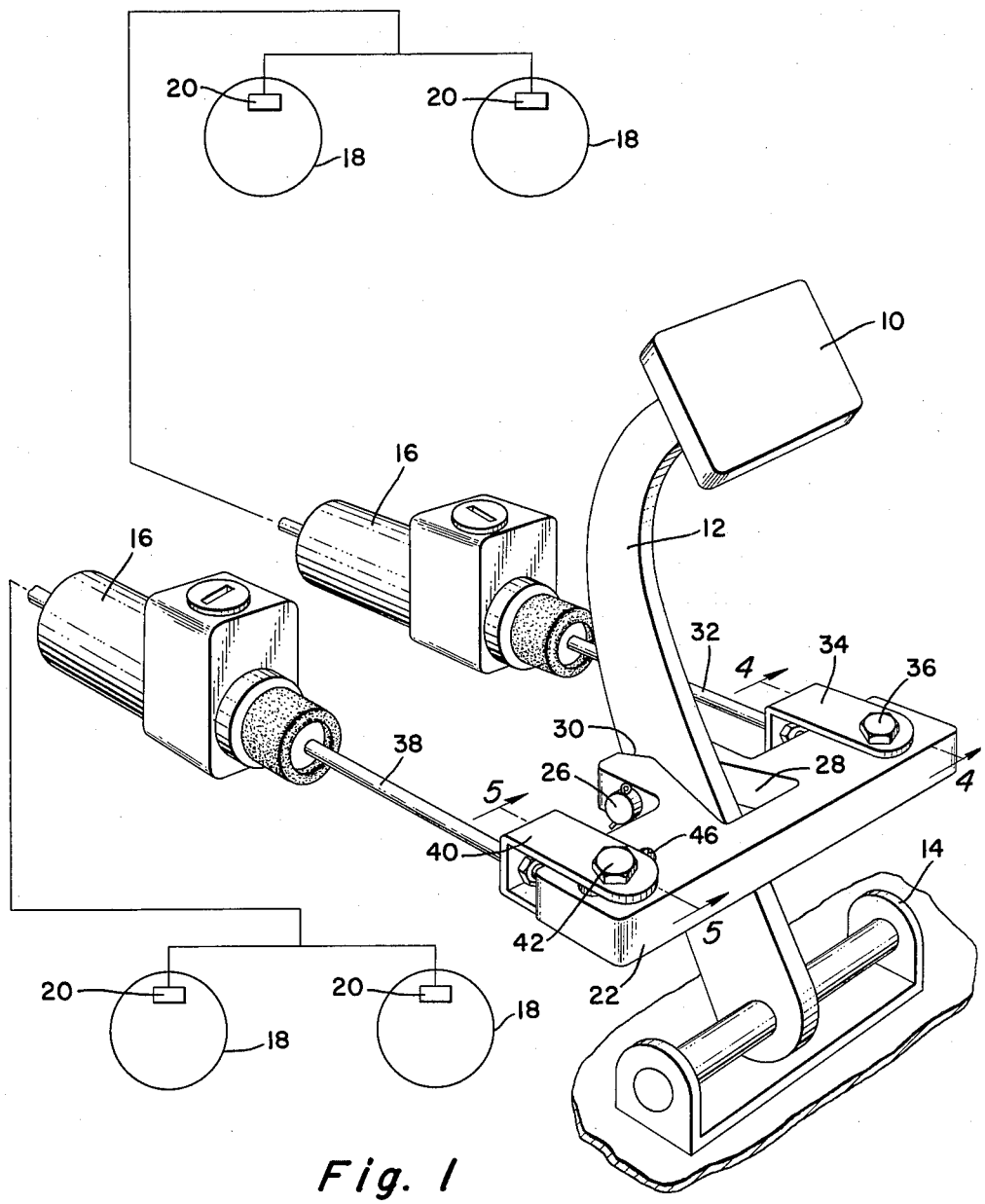
FIGURE 1 is a perspective view of the subject invention illustrated in a vehicle braking system which is shown diagrammatically.

Referring now to FIGURE 1, a brake pedal 10 carried by an arm 12 is pivotally mounted on a bracket 14 which is firmly attached to a stationary part of a vehicle, not shown. A linkage is established in a manner to be hereinafter described between the pivotable arm 12 and a plurality of master cylinders 16 which are arranged in fluid communication with wheel cylinders 20 to actuate the brakes 18. The vehicle braking system, diagrammatically illustrated herein, is a typical automobile hydraulic braking system with the exception that one of the two master cylinders 16 is connected to the front wheel brakes and the other is connected to the rear wheel brakes of the vehicle. It is therefore seen that the front wheels and rear wheels of the vehicle have independent braking systems and, upon failure of either of these systems, the remaining system is available to brake the vehicle.

Figure 2:
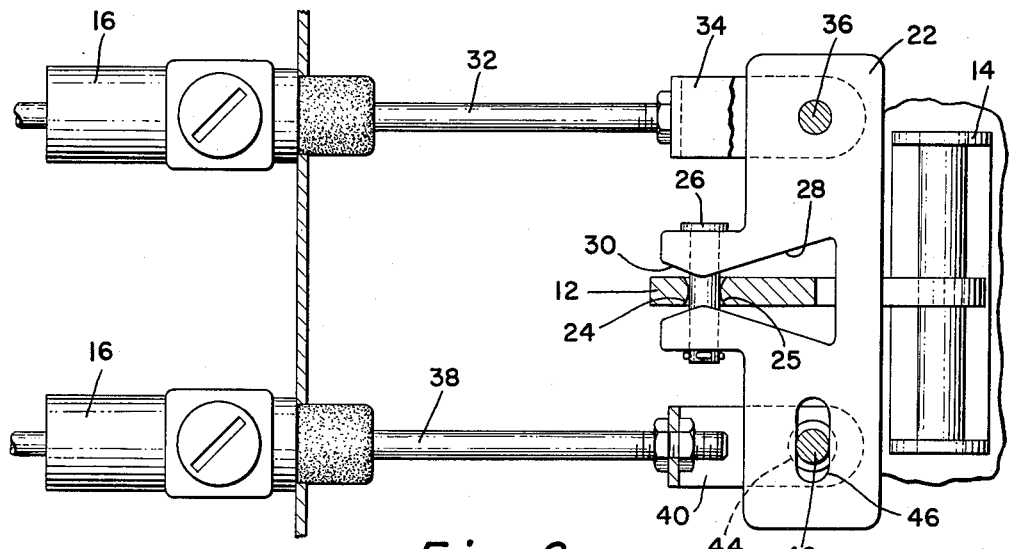
FIGURE 2 is a plan view of the linking bar as it connects with the push rods to the master cylinders.

Referring now to FIGURE 2, an equalizer bar or rigid member 22 pivotally engages the arm 12 through an aperture 24 by means of a pivot pin 26. The aperture 24 has oppositely tapered or flared portions 25 which allow a lateral pivoting of the pivot pin 26 relative to the arm 12 as well as the normal axial type pivoting associated with a pin and aperture linkage arrangement. Clearance is provided for pivoting of the pivot pin 26 relative to the arm 12 by a substantially triangular shaped aperture 28 formed in the equalizer bar 22. On an opposite side of the pivot pin mounting position is an outwardly flared or tapered portion 30 which provides clearance for the equalizer bar as it pivots in either direction. This axial and lateral pivoting capability of the bar 22 is described herein as multiplanar. More clearly, bar 22 is pivotable relative to arm 12 in two planes at all times regardless of what angle arm 22 has been pivoted to assume relative to bar 22.

Figure 4:
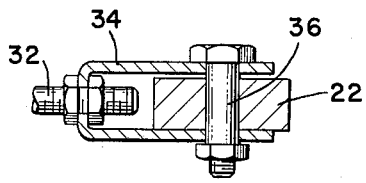
FIGURE 4 is a sectional view taken along line 4—4 of FIGURE 1.

A push rod 32 is disposed to actuate one of the hydraulic master cylinders 16 in any conventional manner and is attached on an opposite end to a yoke 34 which is pivotally mounted at point 36 to the equalizer bar 22. A push rod 38 is arranged to operate another of the hydraulic master cylinders 16 in any conventional manner and is attached on an opposite end to a yoke 40 which, in turn, is pivotally attached to the equalizer bar 22. It should be understood that rods 32 and 38 are the conventional type pivotally carried on the driving end by pistons in cylinders 16. A pin 42 passes through apertures in the yoke 40 and is arranged to be slidable in a slot 46 in the equalizer bar 22. The yokes 34 and 40 are shown in section in the FIGURES 4 and 5 in order to more clearly point out their method of engagement with the equalizer bar 22. It is understood that the yokes 34 and 40 could be reversed in their mounting on the equalizer bar 22 without departing from the intended mode of operation.

Referring now to FIGURE 1, in operation, a force would be exerted on the brake pedal 10. This force would induce a pivotal movement in the arm 12 due to its pivotal mounting on the bracket 14. The arm 12 would move counterclockwise on its pivotal mounting as viewed in FIGURE 1 and the equalizer bar 22 would be moved in the direction of the master cylinders 16. If both master cylinders 16 were operating normally, a sufficient reactive force would be engendered by both to maintain a balance in pressure distributed to either of them from the arm 12. This is the normal mode of operation of the system and, under these circumstances, the equalizer bar 22 establishes a link between the pedal and the master cylinders.

In the event one of the master cylinders or the hydraulic system associated therewith fails, an application of force on the brake pedal 10 would pivot the arm 12 in the direction of the two master cylinders 16 in the same manner as previously described. However, the failure of the one master cylinder or hydraulic system would provide little reactive force against the associated push rod and this push rod would be driven into the master cylinder until it bottomed out therein.

Figure 3:
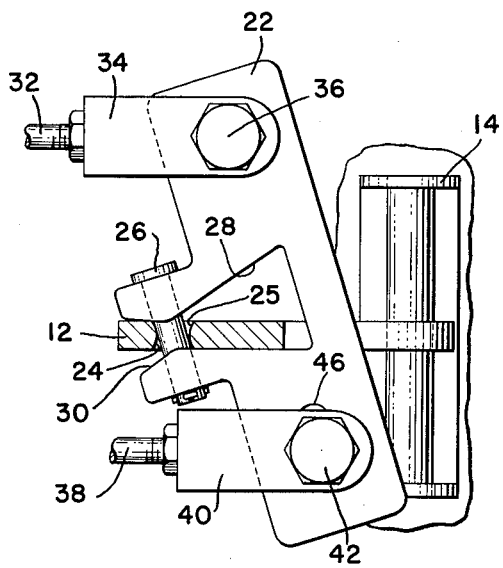
FIGURE 3 illustrates the equalizing bar in a position it assumes during brake actuation when one of the master cylinders has failed.

Referring now to FIGURE 3, it is presumed that the master cylinder engaging the push rod 32 has failed. Consistent with this invention, the push rod 32 would be driven into the master cylinder and would assume a position relative to the master cylinder push rod 38 as illustrated in FIGURE 3. At the same time, the side of the triangular aperture 28 would engage the side of the arm 12 and one of the portions 30 being tapered would likewise engage an opposite side of the arm 12. This engagement of arm 12 with the sides of aperture 28 serves to stabilize push rods 32 and 38 relative to the brake pedal arm 12 during pivotal movement thereof. Any further pivoting of the equalizer bar 22 would thereafter be prevented and further movement of the arm 12 in a pivotal manner toward the master cylinder 16 would result in direct force transmission between the equalizer bar 22 and the push rod 38. In this manner, the vehicle brakes engaged by the operative master cylinder and system would be engaged during a period of time when the other master cylinder and system were inoperative.

Figure 5:
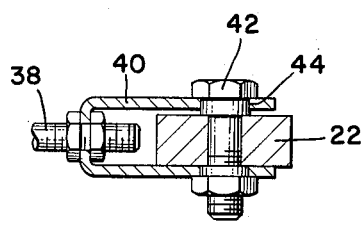
FIGURE 5 is a sectional view taken along line 5—5 of FIGURE 1.

Referring to FIGURE 5, pin 42 is similar to pin 36 but includes a flange 44 engageable with yoke 40 to provide a mounting surface bearing against yoke 40 and against bar 22 to allow pivotal movement of bar 22 with respect to yoke 40 as well as sliding movement of yoke 40 relative to bar 22. The slot 46 is designed to cooperate with the pin 42 in order to provide a different force distribution than is possible with the pivot points 36 and 42 equidistant from the arm 12. If, for example, more or less force is desired to be transmitted to one push rod than the other, a movement of the pin 42 in the slot 46 will change the proportion of the total force exerted by the arm 12 on either of the push rods. This extends the utility of a given equalizer bar from a system requiring equal force transmission to master cylinders to one requiring different forces to different master cylinders. One example of this need might be in an installation using identical master cylinders, one for front and one for rear wheel brakes, wherein greater force is desired on the front wheel brakes during a stop.

The utility of the present invention, when used in the operative environment of a dual master cylinder braking system actuated by a single brake pedal, becomes apparent. It is understood that some dual master cylinder brake systems currently in use have force equalizing mechanisms, but the subject device accomplishes the intended functions using very simplified mechanisms of economic manufacture. Another advantage of the subject device is that, during periods of low fluid content in either one of the master cylinders or greater brake lining wear in the brakes actuated by one of the master cylinders, a slightly non-perpendicular relationship will be set up between the equalizer bar and the arm 12 during initial movement of the arm 12 and, thereafter, equal force transmission will be possible.

A further advantage of the subject device is that, where there is total failure in one of the braking systems, the equalizer bar 22 will be cocked into a full travel position wherein the arm 12 will cooperate with sides of the triangular aperture as well as sides of the tapered portion thereafter establishing a very positive force transmitting relationship between the arm 12 and the operable push rod 32 or 38. Automatic compensation for the tendency of the equalizer bar to cause a disruption of the parallel relationship of the push rods 32 and 38 is accomplished.

While the embodiment of the present invention, as herein disclosed, constitutes a preferred form, it is to be understood that other forms might be adopted.

What is claimed is as follows:

1. A force equalizer system for a vehicle braking system having separate master cylinders for front and rear wheel brakes and a brake pedal for actuation thereof, said force equalizer comprising: a rigid member pivotally engaged to parallel disposed push rods to the master cylinders, said rigid member carried by the brake pedal and pivoted in a multiplanar manner with respect thereto, said rigid member including means for stabilizing the brake pedal relative to a push rod when one of the master cylinders fails and presents no resistance to a force exerted thereon.

2. A force equalizer system for a vehicle braking system having separate master cylinders for front and rear wheel brakes and a brake pedal for actuation thereof, said force equalizer comprising: a rigid member pivotally engaged to parallel disposed push rods to the master cylinders, said rigid member carried by the brake pedal and pivoted in a multiplanar manner with respect thereto, said rigid member having first means adapted to simultaneously drive the push rods into the master cylinders when the relationship of the rigid member to the push rods is perpendicular and to stabilize a push rod relative to the brake pedal during movement thereof when the perpendicular relationship therebetween is altered as a master cylinder fails and offers no reactive force during actuation thereof, said rigid member having second means adapted to present a plurality of force distribution relationships between the push rods to the master cylinders.

3. A force equalizer system according to claim 2 wherein said first means including an aperture, said aperture being substantially triangular in shape on one side of a pivotal connection between said brake pedal and rigid member, and being outwardly flared on the other side of said pivotal connection and a pin drawn through the rigid member perpendicular to the plane of the slot and forming said pivotal connection, the brake pedal having an opposed flare opening therein to permit multiplanar pivotal movement of the rigid member with respect to the brake pedal.

4. A force equalizer system according to claim 2 wherein the second means is an elongated slot in the rigid member providing a variable pivot engagement for the push rod to the rigid member.

References Cited by the Examiner

UNITED STATES PATENTS

| 1,678,949 | 7/1928 | Moser | 188—152 X |
| 2,559,850 | 7/1951 | Davis | 188—156 X |
| 2,754,938 | 7/1956 | Gallay | 188—152 |
| 2,902,121 | 9/1959 | Young et al. | 74—478 X |
| 3,153,328 | 10/1964 | Seethaler | 188—478 X |

MILTON KAUFMAN, *Primary Examiner.*